UNITED STATES PATENT OFFICE.

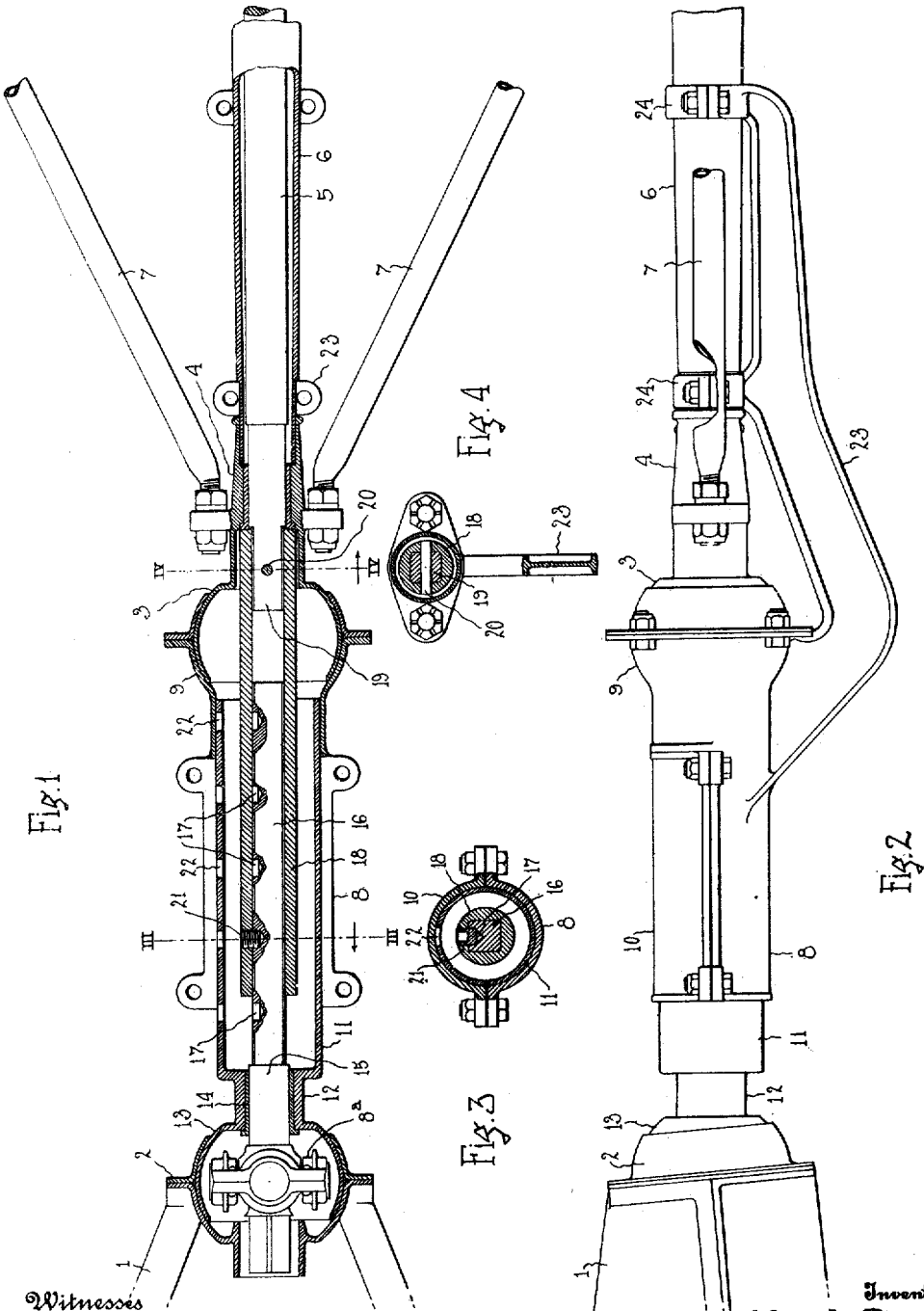

NELS L. OLSON, OF DETROIT, MICHIGAN.

ADJUSTABLE AUTOMOBILE EXTENSION.

1,243,862.  Specification of Letters Patent.  Patented Oct. 23, 1917.

Application filed November 8, 1916. Serial No. 130,261.

*To all whom it may concern:*

Be it known that I, NELS L. OLSON, a citizen of the United States of America, residing at Detroit, in the county of Wayne and State of Michigan, have invented certain new and useful Improvements in Adjustable Automobile Extensions, of which the following is a specification, reference being had therein to the accompanying drawings.

The chassis of a pleasure or touring automobile can be converted into a chassis for commercial purposes by lengthening the chassis or automobile frame to increase the wheel base, and such changes necessitates an extension in connection with the drive shaft between the transmission and differential mechanisms. This is particularly true in connection with the well known "Ford" automobile, and my invention has special reference to an adjustable extension for parts of a "Ford" automobile.

My invention aims to provide an adjustable extension by which the wheel base of a "Ford" chassis may be increased or decreased in accordance with a frame extension and body to be carried thereby, and the adjustable extension includes parts that can be readily installed or associated with well known "Ford" parts, thereby obviating the necessity of alterations or material changes that would incur time and expense. A feature of the adjustable extension is the ease with which adjustments can be made and the manner in which rigidity is secured between the extension and the drive shaft tube or casing.

In order that my invention may be clearly understood, I have deemed it necessary to illustrate certain well known Ford parts, and reference will now be had to the drawing, wherein—

Figure 1 is a horizontal sectional view of the adjustable extension coupled to Ford parts;

Fig. 2 is a side elevation of the same;

Fig. 3 is a cross sectional view, taken on the line III—III of Fig. 1; and

Fig. 4 is a similar view taken on the line IV—IV of Fig. 1.

In the drawing, 1 denotes a portion of a transmission casing supporting a flexible universal joint housing 2. Ordinarily fitting in the housing 2 is a ball member 3 having a front drive shaft bushing 4 for a drive shaft 5. A drive shaft tube or casing 6 and rear radius rods 7 are also connected to the front bushing 4, and with the drive shaft 5 connected to the usual flexible universal joint 8ª within the housing 2 there is that part of a Ford assembly which I intend to extend and have therefore shown the ball member 3 removed relative to the housing 2 to accommodate my adjustable extension.

An advantage in connection with the invention is the fact that I utilize the ordinary joint housing 2 and the ball member 3 and simply provide additional ball and housing members, together with a shaft extension.

The reference numeral 8 denotes a jacket, having the rear end thereof provided with a housing 9 designed along the lines of the housing 2 to receive the ball member 3. The front end of the jacket 8 has the top thereof provided with a detachable cap or semi-cylindrical sleeve 10 and mounted in the jacket 8 is a tubular casing 11 having the reduced forward end 12 terminating in a ball member 13 adapted to fit in the joint housing 2 and replace the ordinary ball member 3. The reduced end 12 of the tubular casing 11 has a bushing 14 for the usual coupling member 15 of the universal joint 8ª, and extending into the coupling member 15 is a longitudinal extension shaft 16 which is preferably rectangular in cross section and has the upper face thereof provided with spaced recesses 17. Telescoping the extension shaft 16 is an extension sleeve 18, said extension sleeve having rectangular bores to receive the extension shaft 16 and the rectangular end or shank 19 of the usual drive shaft 5. Ordinarily the shank 19 of the drive shaft 5 fits in the shaft coupling 15 of the universal joint 8ª. The extension sleeve 18 is connected to the shank 19 of the drive shaft 5 by a transverse pin 20 or other fastening means. Contiguous to the forward end of the extension sleeve is a screw 21 adapted to extend into one of the recesses 17 of the extension shaft 16 and hold said extension sleeve relative to the extension shaft, yet permit of longitudinal adjustment of the extension sleeve on the extension shaft.

With the tubular casing 11 fitting in the jacket 8, said tubular casing can be adjusted therein simultaneously with an adjustment of the extension sleeve 18 relative to the extension shaft 16, thus permitting of my improvement being bodily increased or decreased in its longitudinal dimensions. Access is had to the screw 21, after removing the cap 10, through the medium of a series of openings 22 in the tubular casing 11.

Connecting the rear end of the jacket 8 and the forward end of the drive shaft tube or casing 6 is a longitudinally extending member 23 which has the forward end thereof integral with the jacket 8 and the rear end thereof provided with semi-cylindrical portions engaging the bottom side of the tube or casing 6 and held in engagement therewith by straps 24. The member 23 is adapted to stiffen the connection between the forward end of the drive shaft tube 6 and the rear end of the jacket 8, thus providing an indirect connection between the rear radius rods 7 and the extension jacket.

From the foregoing, it will be observed that there are inner and outer sets of telescopic members between the usual universal joint and the forward end of a drive shaft, these members insuring sufficient rigidity and at the same time constituting an adjustable extension for the power transmitting means between the transmission and differential mechanisms of a motor driven vehicle. The telescopic members connecting the joint housing and bushing serve as a housing for the inner telescopic members connecting the universal joint proper with the drive shaft, and the construction of the outer members is such that easy access may be had to the inner members for adjusting the same for a desired wheel base.

While I have herein described my invention as being particularly adapted for Ford parts, it is to be understood that the principle involved is applicable to other automobiles and that the structural elements are suscepticle to modifications without departing from the scope of the appended claims.

What I claim is:—

1. An adjustable extension adapted for power transmission between the transmission and differential mechanisms of an automobile, comprising telescopic members having the ends thereof constructed and adapted for connecting a universal joint and a drive shaft, and telescopic members inclosing said power transmission telescopic members and having ends thereof constructed and adapted for connecting a universal joint housing and a drive shaft tube.

2. An adjustable extension for automobiles comprising a jacket having a housing adapted to receive a bushing ball member, a casing in said jacket having a ball member adapted to engage in a universal joint housing, and telescopic members in said casing adapted for connecting a universal joint and drive shaft.

3. An adjustable extension for automobiles, comprising a jacket adapted to receive a bushing ball member, an adjustable casing in said jacket having a ball member adapted to engage in a universal joint housing, and normally fixed telescopic members in said casing adapted for connecting a universal joint and drive shaft.

4. In an adjustable extension for automobiles, the combination with a joint housing, a universal joint in said housing, a drive shaft tube, and a drive shaft, of outer telescopic members connecting said joint housing and said drive shaft tube, and inner telescopic members connecting said universal joint and said drive shaft.

5. In an adjustable extension for automobiles, the combination with a joint housing, a universal joint in said housing, a drive shaft tube, and a drive shaft in said tube, of outer telescopic members connecting said joint housing and said drive shaft tube, inner telescopic members connecting said universal joint and said drive shaft, and a stiffening member connecting one of said outer members and said drive shaft tube.

6. In an adjustable extension for automobiles, the combination with a joint housing, a universal joint in said housing, a drive shaft bushing having a ball member, and a drive shaft in said bushing, of a jacket having a housing to receive the ball member of said drive shaft bushing, a casing in said jacket having a ball member to engage in said joint housing, and longitudinally adjustable members in said casing and said jacket connecting the universal joint and said drive shaft.

7. In an adjustable extension for automobiles, the combination with a joint housing, a universal joint in said housing, a drive shaft bushing having a ball member, and a drive shaft in said bushing, of a jacket having a housing to receive the ball member of said drive shaft bushing, an adjustable apertured casing in said jacket having a ball member to engage the joint housing, longitudinally adjustable members in said casing and said jacket connecting said universal joint and said drive shaft, and means connecting said members and adapted to register with an aperture of said casing.

8. In an adjustable extension for automobiles, the combination with a joint housing, a universal joint in said housing, a drive shaft tube, a bushing carried by said tube and having a ball member, and a drive shaft in said tube, of a jacket having a housing to receive the ball member of said bushing, a casing in said jacket having a ball member to engage in said joint housing, adjustable members in said casing and said jacket connecting said universal joint and said drive shaft, and a stiffening member connecting said jacket and said drive shaft tube.

9. In an adjustable extension for automobiles, a joint housing, a universal joint in said housing, a drive shaft tube, a drive shaft in said tube, tubular members fixed relative to said drive shaft tube and having a universal connection with said joint housing, and members connecting said universal joint and said drive shaft and capable of longitudinal adjustment.

10. In an adjustable extension for automobiles, a joint housing, a universal joint in said housing, a drive shaft tube, a drive shaft in said tube, a jacket fixed relative to said drive shaft tube, an apertured casing clamped in said jacket and having a universal connection with said joint housing, adjustable members in said casing connecting said universal joint and said drive shaft, and a cap carried by said casing and permitting of access to said adjustable members through the apertures of said casing.

11. In an adjustable extension for automobiles, a joint housing, a universal joint in said housing, a drive shaft tube, a drive shaft in said tube, telescopic members fixed relative to said drive shaft tube, and having a universal connection with said joint housing, and telescopic members connecting said universal joint and said drive shaft and capable of longitudinal adjustment.

In testimony whereof I affix my signature in the presence of two witnesses.

NELS L. OLSON.

Witnesses:
KARL H. BUTLER,
G. E. McGRANN.

Copies of this patent may be obtained for five cents each, by addressing the "Commissioner of Patents, Washington, D. C."